March 22, 1966   P. MARTIN   3,241,400
AUTOMATIC AND CONTINUOUS CHANGE-SPEED MECHANISM
Filed July 24, 1962
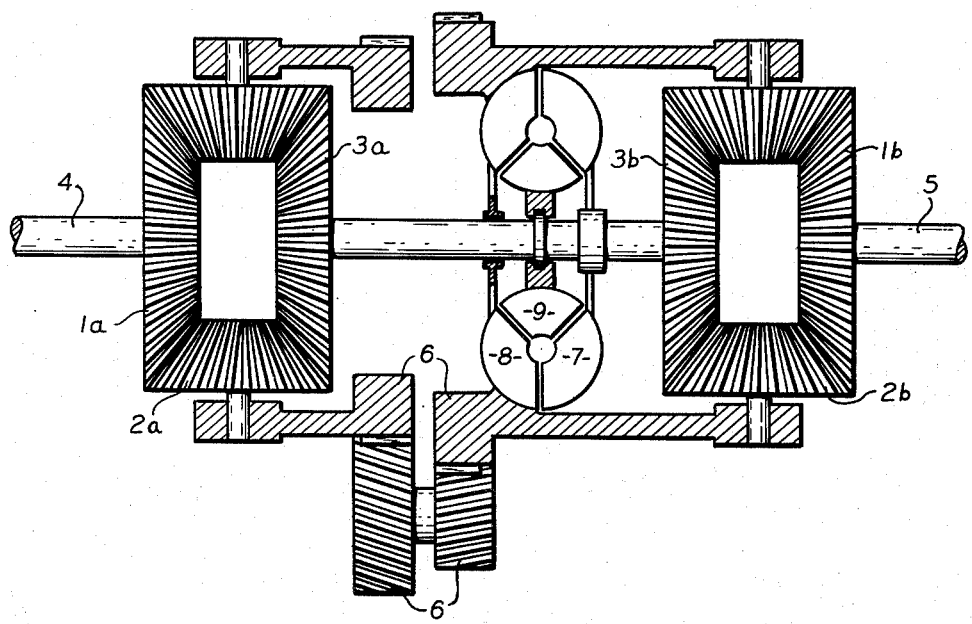
INVENTOR
PABLO MARTIN
BY
Ernest G. Montague
ATTORNEY.

3,241,400
AUTOMATIC AND CONTINUOUS CHANGE-SPEED MECHANISM

Pablo Martin, Vicuna Mackenna 5969, Santiago, Chile
Filed July 24, 1962, Ser. No. 212,107
Claims priority, application Spain, July 29, 1961, 269,448; Apr. 30, 1962, 276,927
1 Claim. (Cl. 74—751)

The present invention relates to an automatic transmission mechanism or gear, the transmission ratio of which is variable, the same being able to adopt any value in a continuous manner, and based on new groupings of epicyclic and simple gears. The mechanism can be applied in internal combustion engines and synchronous motors.

It is one object of the present invention to provide an automatic and continuous change speed mechanism, wherein a driving shaft or axle is able to deliver its motion and transmit the power to two different axles or shafts together, which is achieved by means of a plane or spherical epicyclic train of gears.

It is another object of the present invention to provide an automatic and continuous change speed mechanism, wherein the rotary movement of each of the shafts receiving the power delivered by the driving shaft is to be reduced or increased by means of a simple train of gears or by any other conventional means, the increasing or reducing ratio being different for each of the shafts and having a constant value.

It is still another object of the present invention to provide an automatic and continuous change speed mechanism, wherein the movements of the two shafts to be merged or combined, after the reduction or increase, the two shafts deliver their power to a single shaft or axle, hereinafter called the resisting shaft or axle and which is the shaft or axle communicating finally with the members which consume the power. This last merging or combining step is achieved with a second epicyclic train operating in the reverse manner to the first train.

It is yet another object of the present invention to provide an automatic and continuous change speed mechanism, wherein an element, transmitting power from one shaft of the mechanism to the other, compels the resisting shaft or axle to move it to assume ever greater speeds. This element is the element causing changes in the transmission ratio.

The step of reducing and increasing, respectively, may be deleted by making the first and second epicyclic trains different in their structural dimensions or causing them to have different groupings.

With these and other objects in view, which will become apparent in the following detailed description, the present invention will be clearly understood in connection with the accompanying drawing, in which The only figure is an axial section of the mechanism with all its elements, including a hydraulic torque converter.

Referring now to the drawing, trains of spherical epicyclic gears are provided. In the case of spherical epicyclic trains, there are three parts: each of the sun gears and each pair of planetary gears of the same train of gears constitute one part. It is even possible to form a combination in such manner that the first train of gears is plane and the second spherical, or vice versa.

The automatic and continuous change-speed mechanism is not complete for application purposes, since, once the corresponding motor or engine is coupled, the power delivered by it will tend to follow the easiest path and, what is more, the internal combustion engine will not deliver power if this is not required. Since the driving shaft may be rotating at high speed, while the resisting shaft is motionless, this would be the easiest path for the power and the necessary stresses for the starting of the resisting shaft would not be produced, since, moreover, power would not be demanded of the engine. In order to avoid this, it is necessary to establish an internal friction between the parts of the mechanism, which will promote starting and act in the sense of compelling the resisting shaft to assume ever greater speeds. In order to establish this internal friction, it is necessary to interpose a further element between the two groups of the mechanism, which may be hydraulic (hydraulic torque converter), electric (motor), mechanical (flywheel of suitable mass) or a speed regulator for one of the parts of the trains of epicyclic gears.

The mechanism designed in accordance with the present invention comprises an interposed hydraulic torque converter 7, 8 and 9, the driving shaft 4 is connected to one sun gear 1a and the resisting shaft 5 to the other sun gear 1b; the two groups of planetary gears 2a, 2b and the ring gears are also connected to one another. The shaft connecting the crown gears 3a, 3b is connected to the pump 7 of the hydraulic torque converter and the shaft of the planetary gears 2a, 2b is connected to the rotor 8. The reactor 9 of the converter may be fixed or mounted on a free wheel.

It should be explained that $$WE(a+b) = W_c \cdot a + W \cdot b$$

$$WE\left(\frac{a}{n} + \frac{b}{m}\right) = W_c \frac{a}{n} + \Omega \frac{b}{m}$$

Wherein:

$$\frac{a}{b} = u; \quad \frac{m}{n} = v$$

According to this annotation, $$W_E(1+u) = W_c u + W$$

$$W_E(1+vu) = W_c uv + \Omega$$

$$\frac{W}{\Omega} = \frac{(1+u) - u\frac{W_c}{W_E}}{(1+uv) - uv\frac{W_c}{W_E}}$$

In a hydraulic torque converter it is possible to obtain with good efficiency transmission ratios between the driving device (the pump 7) and the resistant element (the rotor 8) ranging from approximately 1:½, to 1:1. Assuming that the range which it is desired to utilise is from 1:⅔ to 1:1, $W_c/W_e$ may from 3/2 to 1. Constructionally when $u=1.5$ and $v=1.3$, $$\frac{W}{\Omega} = \frac{2.5 - 1.5\frac{W_c}{W_E}}{2.95 - 1.95\frac{W_c}{W_E}}$$

If $$\frac{W_c}{W_E} = \frac{3}{2} = 1.5 \rightarrow \frac{W}{\Omega} = 10$$

If $$\frac{W_c}{W_E} = 1 \rightarrow \frac{W}{\Omega} = 1$$

That is, with a hydraulic torque converter in which the speed ratio of pump:rotor varies from 1:⅔ to 1:1, the speed ratio of the driving shaft to the resistant shaft will vary from 1:1/10 to 1:1. The effect of the mechanism is clear.

Constructively, it is possible to obtain other values for the ratio $W/\Omega$; using the same range of variation between the speed ratio of pump:rotor and constructing the mechanism in such manner that "$u$" and "$v$" have other values.

Another possibility of interposing the hydraulic torque converter is to locate the pump 7 and the rotor 8 so that they are connected, respectively to the shafts connecting the planetary gears 2a, 2b and to the first sun gear 1a.

In similar manner to the foregoing case, $$W_E(1+u)=W_c u+W$$

$$W_E=\frac{Wv-\Omega}{v-1}$$

$$W_E(1+uv)=W_c uv+\Omega$$

$$\frac{W}{\Omega}=\frac{1}{v-\frac{W_E}{W}(v-1)}$$

If it is assumed that "$v>1$," for starting, when $\Omega$ is equal to zero, $W_E>W$. The driving shaft 4 actuates the sun gear 1a and this drives the planetary gears 2a; these tend to rotate more rapidly than the sun gear, but, due to the braking action imposed by the oil in the hydraulic converter, $W_E$ decreases, being compensated by the changes in speed of $W_c$. In this way, the equilibrium between $W_E$ and $W_c$ is destroyed and this makes $\Omega=0$, and on the resisting shaft there is produced the corresponding stress which causes it to accelerate.

Considering the margins of variation of $W/\Omega$. Assuming that the mechanism has been constructed in such manner that $v=2.5$, in starting $\Omega=0$ and $$\frac{W_E}{W}=\frac{5}{3}$$

When the pump 7 and the rotor 8 rotate approximately at the same speed, that is $$\frac{W_E}{W}=1$$

then $$\frac{W}{\Omega}=1$$

In accordance with the foregoing, for variations in the speed ratio of pump, rotor from 1:⅗ to 1:1, the speed ratio of the driving shaft 4 to the resisting shaft 5 varies from a large value, at the beginning to the value of 1:1.

Furthermore, there are other possibilities of interposing the hydraulic torque converter.

The embodiment disclosed in the drawing makes reference to the case where use is made of trains of spherical epicyclic gears. The shaft of the planetary gears 2b of the second epicyclic train is connected to the rotor 8 of the hydraulic torque converter and the shaft of the crown gears 3a, 3b to the pump 7, it being possible for the reactor 9 to be fixed or mounted on a free wheel.

For this case and in accordance with the notations already used:

$$2W_{E1}=W+W_p$$

$$\frac{2}{n}W_{E1}=\Omega+W_p$$

$$\frac{1}{n}W_{E1}=W_{E2}$$

$$\frac{W}{\Omega}=\frac{2n-\frac{W_p}{W_{E2}}}{2-\frac{W_p}{W_{E2}}}$$

By constructing the simple train of gears 6 in such manner that $n=1.5$, as shown in the drawing, $$\frac{W}{\Omega}=\frac{3-\frac{W_p}{W_{E2}}}{2-\frac{W_p}{W_{E2}}}$$

In similar manner to the foregoing cases, considering a range of variation between the speed ratio of pump: rotor of the converter such that $W_p/W_{E2}$ varies from 1.9 to 1, If $$\frac{W_p}{W_{E2}}=1.9\rightarrow\frac{W}{\Omega}=11$$

If $$\frac{W_p}{W_{E2}}=1\rightarrow\frac{W}{\Omega}=2$$

The same considerations as were given for the case of the trains of plane epicyclic gears are valid here.

For all the cases described, the efforts transmitted from the pump 7 to the rotor 8 are internal efforts in the mechanism and, therefore, from the dynamic point of view.

$\xi_w=$driving torque; $\xi\Omega=$resisting torque $$\xi_w W=\xi_\Omega+P_f$$

$P_f$ being the losses due to friction and heating of the oil in the mechanism.

The ratio of 1:1 between the pump and the rotor is never achieved in hydraulic torque converters since there is always some slip, but values very close thereto are obtained, for which reason this detail is of no importance in the discussion which has taken place.

In accordance with what is stated concerning the manner of interposing the hydraulic torque converter, this, in general must be located between two groups of the mechanism (we have already seen before that the number of groups is four), one of which will be connected to the pump 7 and the other to the rotor 8, it being possible for the reactor 9 to be fixed, mounted on a free wheel or connected to another group of the mechanism. There is, therefore, a varied range of possibilities for interposing the hydraulic torque converter within the mechanism, according to the value between which it is desired that the ratio $W/\Omega$ should vary; this range of variation is also conditioned by the values of "$u$" and "$v$" which are adopted for the design and construction of the mechanism, or by the value of "$n$" where spherical epicyclic gears are concerned. In this manner, with a specific range of variation of the speed ratio of pump:rotor, there are obtained ranges of variation of $W/\Omega$ which are suitable for the use desired. This effect is fundamental and gives the apparatus great flexibility.

It is also possible to locate an electrical element or unit, such as a direct current motor or an induction motor with a wound rotor, in a similar manner to that, in which the hydraulic torque converter is located and with the same object. The manner of interposing the same is the same as that which has been explained for the hydraulic converter, considering the rotor and stator, respectively, of the electric motor in the place of the pump and rotor of the converter; that is to say, that group of the mechanism which is connected to the pump is now connected to the rotor of the motor and that group which is connected to the rotor of the converter is connected to the stator of the motor.

The object of interposing an electric motor of variable speed within the mechanism and not directly between the driving shaft and the resisting shaft, without using a gear, is to be able to use a motor of smaller size. The justification for this is that, in the mechanism, while part of the power is transmitted directly, through the gears, from the driving shaft to the resisting shaft, another part would be transmitted internally (within the mechanism) by the electric motor, before the resisting shaft receives it. It would therefore be possible to transmit a great power using an electric motor of variable speed with half or one quarter the power or, in general, less than that.

To the foregoing advantage there is added the advantage that the motor would operate solely within a speed range much smaller than that existing between the driving shaft and the resisting shaft.

If the train of simple gears 6 were to have a large inertia, comparable with the mass which the resisting shaft has to move, when an acceleration occurs in the driving shaft the increase in the speed $W_E$ would tend to be low, due to the fact that it would have to overcome a strong inertia and oblige the resisting shaft to rotate more rapidly, since $$W_{E_1} = \frac{W-\Omega}{2\left(1-\frac{1}{n}\right)}$$

From this last formula the following can be deduced:

$$\frac{W}{\Omega} = 1 + 2\left(1-\frac{1}{n}\right)\frac{W_{E_1}}{\Omega}$$

In the case of internal combustion engines, it is advantageous that when $\Omega$ is small $W/\Omega$ be large. Next, it is advantageous that $W_{E_1}/\Omega$ should decrease in value, be small, so that $W/\Omega$ may have a value close to 1. This is achieved by coupling to the shaft of the train of simple gears, a flywheel having a variable moment of inertia, in such manner that this increases with the speed. It is unnecessary to dilate on these elements, since they are not new per se.

While I have disclosed one embodiment of the present invention, it is to be understood that this embodiment is given by example only and not in a limiting sense, the scope of the present invention being determined by the objects and the claim.

What I claim is:

In an automatic gear transmission mechanism,
a driving shaft,
a driven shaft,
two trains of epicyclic gears operatively connecting said driving shaft with said driven shaft to thereby transmit power from said driving shaft to said driven shaft at a variable transmission ratio,
said driving shaft being operatively connected with one part of one of said epicyclic gear trains,
said driven shaft being operatively connected with one part of the other of said epicyclic gear trains,
the other parts of said two epicyclic gear trains being grouped in two pairs with each of said two pairs being formed by one part of each of said trains, and
fluid torque converter means including a pump, an output turbine and an at least one-bladed reactor,
said reactor being connected by a one-way brake to a stationary housing,
said pump and said output turbine being operatively connected to said other parts of said pairs of gear trains, and
one of said pairs including drive means interposed between the parts of said one of said pairs, the transmission ratio of said interposed drive being predetermined.

References Cited by the Examiner

UNITED STATES PATENTS

| | | | |
|---|---|---|---|
| 934,716 | 9/1909 | Dodd | 74—682 |
| 1,685,461 | 9/1928 | Nichols | 74—751 |
| 1,706,678 | 3/1929 | Pangburn | 74—572 |
| 2,117,340 | 5/1938 | Maurer | 74—689 |
| 2,260,846 | 10/1941 | Boytech | 74—688 |
| 2,301,497 | 11/1942 | Alspaugh | 74—801 |
| 2,330,821 | 10/1943 | Finzi | 74—675 |
| 2,480,032 | 8/1949 | Kochis | 74—682 |
| 2,947,202 | 8/1960 | Calderon | 74—751 |
| 2,948,164 | 8/1960 | Neal | 74—682 X |
| 2,973,669 | 3/1961 | Quigley | 74—682 X |
| 3,079,813 | 3/1963 | Quigley. | |

FOREIGN PATENTS

| | | |
|---|---|---|
| 670,940 | 4/1952 | Great Britain. |
| 861,616 | 2/1961 | Great Britain. |
| 538,645 | 1/1956 | Italy. |

DON A. WAITE, *Primary Examiner*.